US012234954B2

(12) United States Patent
Wang

(10) Patent No.: US 12,234,954 B2
(45) Date of Patent: Feb. 25, 2025

(54) LED LAMP STRUCTURE

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD., Dongguan (CN)

( * ) Notice: Subject to any disclaimer, the term of this patent is extended or adjusted under 35 U.S.C. 154(b) by 0 days.

(21) Appl. No.: 18/829,825

(22) Filed: Sep. 10, 2024

(65) Prior Publication Data

US 2024/0426437 A1 Dec. 26, 2024

(51) Int. Cl.

| | |
|---|---|
| ***F21K 9/237*** | (2016.01) |
| ***F21V 17/06*** | (2006.01) |
| *F21Y 115/10* | (2016.01) |

(52) U.S. Cl.

CPC .............. *F21K 9/237* (2016.08); *F21V 17/06* (2013.01); *F21Y 2115/10* (2016.08)

(58) Field of Classification Search

CPC ............. F21K 9/23; F21K 9/237; F21V 17/06

See application file for complete search history.

(56) References Cited

U.S. PATENT DOCUMENTS

| | | | | |
|---|---|---|---|---|
| 9,310,031 | B2 * | 4/2016 | Su | F21V 23/006 |
| 9,618,191 | B2 * | 4/2017 | Chang | F21V 19/003 |
| 2015/0062928 | A1 * | 3/2015 | Mostoller | F21K 9/90 362/363 |
| 2015/0369432 | A1 * | 12/2015 | Li | F21V 23/003 362/249.02 |
| 2016/0245462 | A1 * | 8/2016 | Demuynck | F21K 9/237 |
| 2018/0078668 | A1 | 3/2018 | Hsiao et al. | |
| 2019/0056069 | A1 | 2/2019 | Luo | |
| 2021/0140622 | A1 | 5/2021 | Lo et al. | |

* cited by examiner

*Primary Examiner* — Tracie Y Green
*Assistant Examiner* — Michael Chiang
(74) *Attorney, Agent, or Firm* — Hemisphere Law, PLLC; Zhigang Ma

(57) ABSTRACT

The present disclosure belongs to the technical field of LED lighting and relates to an LED lamp structure, including a lamp holder, a bulb shell, and an LED light source assembly; the lamp holder is provided with an accommodating chamber with an opening; a straight sleeve is integrally formed in the accommodating chamber in an injection molding manner; a female connector is fixedly mounted in the straight sleeve; the bulb shell is connected to the lamp holder to form a lamp housing; and the LED light source assembly is electrically connected to the female connector and extends into the bulb shell.

10 Claims, 5 Drawing Sheets

LED LAMP STRUCTURE

TECHNICAL FIELD

The present disclosure relates to the technical field of light-emitting diode (LED) lighting, and in particular, to an LED lamp structure.

BACKGROUND

With the rapid development of the lighting industry, lamps using LED filaments as light sources gradually replace tungsten filament lamps and have been rapidly developed and applied in various fields such as an LED filament light string, a camping lamp, a candle light source, and a lawn lamp.

The inventor discloses an LED dimming lamp module in Chinese patent CN217763108U "Intelligent Multi-Color LED Dimming Lamp Module, Lamp Bulb, and Light String". When an LED light-emitting module is assembled into a lamp, a power interface and a plurality of signal plug ports need to be welded at an end portion of the light-emitting module, and the plug ports are electrically connected to an internal pole wire of the lamp into a whole to achieve power on and intelligent control of the lamp. The production operation of the lamp using the LED light-emitting module as the light source is relatively complex, the assembling difficulty is high, and the production cost is high. A further optimization is needed.

SUMMARY

In view of the above defects and shortcomings in the prior art, the present disclosure provides an LED lamp structure, which solves the technical problems of complex production operation, high assembling difficulty, and high production cost of an existing lamp.

To achieve the above objectives, the present disclosure provides an LED lamp structure, including a lamp holder, a bulb shell, and an LED light source assembly; the lamp holder is provided with an accommodating chamber with an opening; a straight sleeve is integrally formed in the accommodating chamber in an injection molding manner; a female connector is fixedly mounted in the straight sleeve; the bulb shell is connected to the lamp holder to form a lamp housing; the LED light source assembly is electrically connected to the female connector and extends into the bulb shell; the female connector includes a connector body; a plug-in slot is provided at a front end of the connector body; at least two conductive terminals are arranged in the plug-in slot; the LED light source assembly includes a PCB, an LED lamp panel, and conductive modules; the LED lamp panel and the conductive modules are respectively electrically connected to two ends of the PCB; at least two conductive contact pieces are arranged between the conductive modules; and when the conductive modules are plugged into the plug-in slot, the conductive contact pieces and the conductive terminals are in mutual contact for conduction.

Preferably, the female connector further includes a power supply wire; the power supply wire is electrically connected to the conductive terminals; and the power supply wire extends out of the straight sleeve and is integrally formed with the lamp holder in an injection molding manner.

Preferably, the LED lamp structure further includes a wiring terminal; the conductive terminals are threaded out of the connector body; the power supply wire at least includes two pole wires; the pole wires are connected to the conductive terminals; and the wiring terminal is wrapped outside connection positions between the pole wires and the conductive terminals.

Preferably, the LED lamp structure further includes a hollow plastic seat; the hollow plastic seat is arranged in the accommodating chamber; and the LED lamp panel is threaded out of a top end of the plastic seat and extends into the bulb shell.

Preferably, a limiting structure configured to fix the LED lamp panel is arranged at the top end of the plastic seat; the PCB is provided with a limiting step corresponding to the limiting structure; and the limiting step resists against a lower end surface of the limiting structure.

Preferably, a waterproof step is arranged at a periphery of a lower end of the plastic seat; the waterproof step is arranged between a lower end of the bulb shell and the lamp holder; and the bulb shell is in threaded connection with the lamp holder and presses the waterproof step to achieve sealing fit between the bulb shell and the lamp holder.

Preferably, the PCB is further provided with a controller module; and the controller module includes a control integrated circuit (IC) chip and other electronic devices.

Preferably, the conductive terminals extend out of the plug-in slot and form bent portions; and the bent portions are fixedly connected to side walls of the plug-in slot.

Preferably, the conductive terminals are conductive springs embedded in the plug-in slot.

Preferably, a partition plate is further arranged inside the plug-in slot, and the conductive modules are provided with jacks that cooperates with the partition plate.

Beneficial effects: Compared with the prior art, the present disclosure is an LED lamp structure. The present disclosure has the following advantages:

1. Due to the arrangement of a connection module at an end portion of the PCB, the PCB can be plugged to the connector body for powering on and signal conduction, without soldering pins, making production and assembling easier and faster, and reducing the production cost.
2. The limiting structure is arranged on an end surface of an upper end of a plastic wick pole, which can prevent the PCB from extending excessively, avoid the PCB from being loosened and falling off from the plug-in slot of the connector body, and ensure that the LED light-emitting module is centered in a lampshade.
3. The waterproof step is arranged on an outer ring of a lower end of the plastic wick pole, and the waterproof step is arranged between a lower end surface of the lampshade and the lamp holder and is used as a waterproof rubber ring to achieve a sealing and waterproofing effect. The problem of waterproofing of a 360-degree light-emitting lamp structure is solved, so that the 360-degree light-emitting lamp structure has a wider range of application scenarios.

Figure 1:
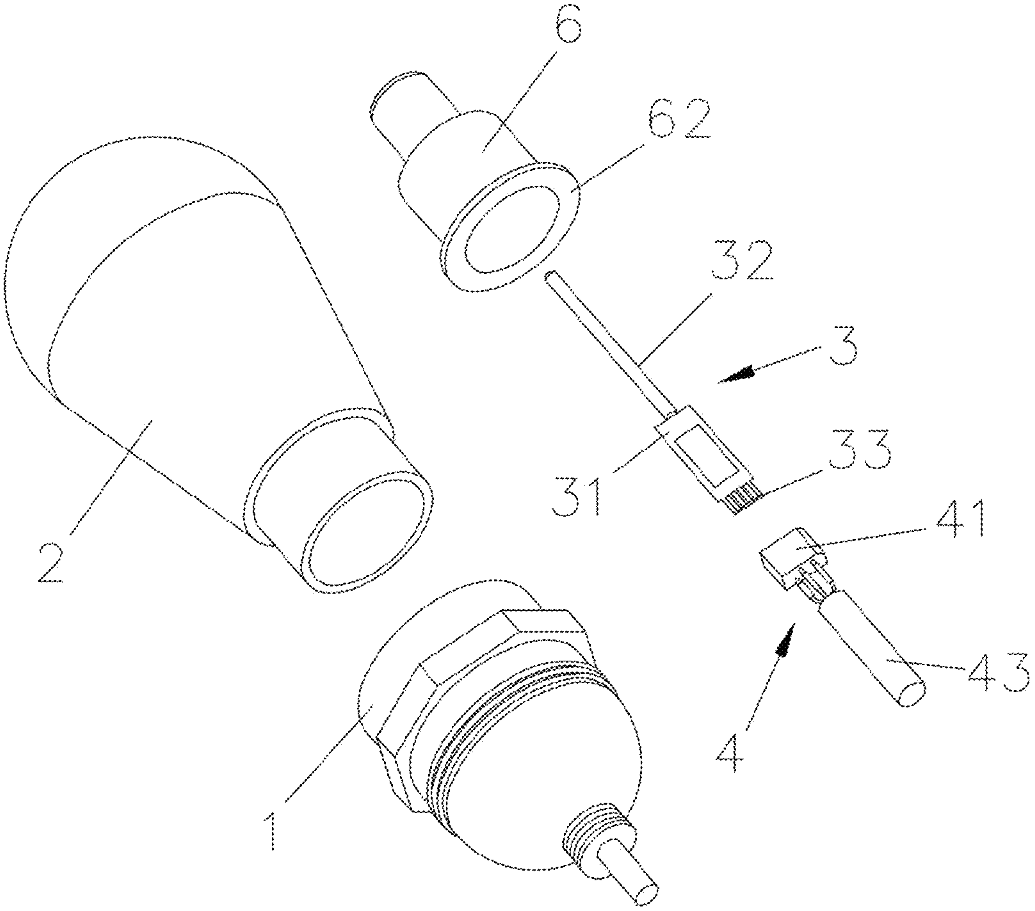
FIG. 1 is a schematic diagram of an exploded structure according to the present disclosure.

Reference numerals include:

1: lamp holder; 11: accommodating chamber; 12: straight sleeve; 2: bulb shell; 3: LED light source assembly; 31: PCB; 311: limiting step; 312: controller module; 32: LED lamp panel; 33: conductive module; 331: conductive contact piece; 332: jack; 4: female connector; 41: connector body; 42: plug-in slot; 421: conductive terminal; 422: bent portion; 423: partition plate; 43: power supply wire; 431: pole wire; 5: wiring terminal; 6: plastic seat; 61: limiting structure; and 62: waterproof step.

DETAILED DESCRIPTION OF THE EMBODIMENTS

The present disclosure will be explained below in conjunction with the accompanying drawings 1 to 5.

The embodiments of the present disclosure provide an LED lamp structure, including a lamp holder 1, a bulb shell 2, and an LED light source assembly 3; the lamp holder 1 is provided with an accommodating chamber 11 with an opening; a straight sleeve 12 is integrally formed in the accommodating chamber 11 in an injection molding manner; a female connector 4 is fixedly mounted in the straight sleeve 12; the bulb shell 2 is connected to the lamp holder 1 to form a lamp housing; the LED light source assembly 3 is electrically connected to the female connector 4 and extends into the bulb shell 2; the female connector 4 includes a connector body 41; a plug-in slot 42 is provided at a front end of the connector body 41; at least two conductive terminals 421 are arranged in the plug-in slot 42; the LED light source assembly 3 includes a PCB 31, an LED lamp panel 32, and conductive modules 33; the LED lamp panel and the conductive modules are respectively electrically connected to two ends of the PCB 31; at least two conductive contact pieces 331 are arranged between the conductive modules 33; and when the conductive modules 33 are plugged into the plug-in slot 42, the conductive contact pieces 331 and the conductive terminals 421 are in mutual contact for conduction.

According to the present disclosure, the conductive modules 33 are arranged at the end portions of the PCB 31, so that the PCB 31 can be plugged into the plug-in slot of the female connector 4 for powering on and signal conduction without soldering pins, which lowers the assembling difficulty of the lamp, makes the production and assembling of the lamp easier and faster, and reduces the production cost.

Figure 2:
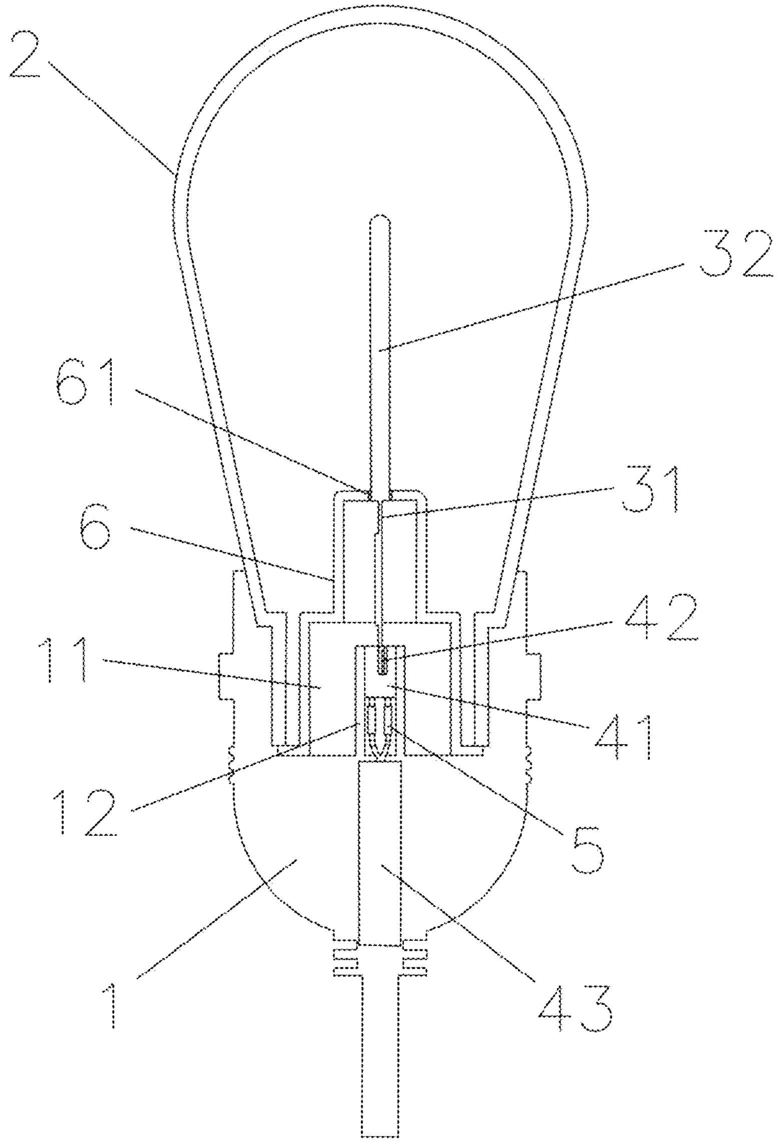
FIG. 2 is a schematic diagram of an internal structure of the present disclosure.

In an embodiment, as shown in FIG. 2, the female connector 4 further includes a power supply wire 43; the power supply wire 43 is electrically connected to the conductive terminals 421; and the power supply wire 43 extends out of the straight sleeve 12 and is integrally formed with the lamp holder 1 in an injection molding manner. The power supply wire extends out of the lamp to achieve electric conduction of the entire lamp. The lamp holder 1 can be further injection-molded on the wire to achieve the fixation of the entire lamp. The structure is simple, and formation of a light string is facilitated.

Figure 4:
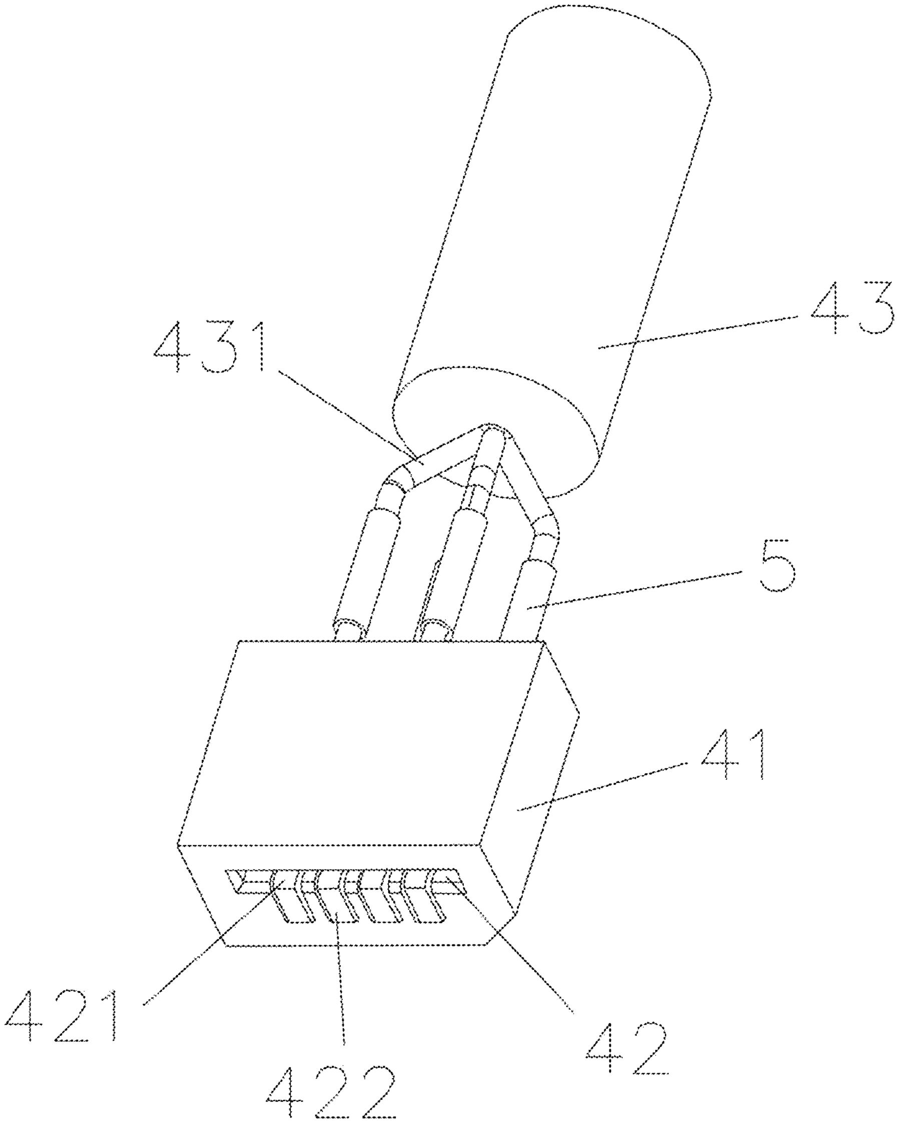
FIG. 4 is a schematic structural diagram of a female connector of the present disclosure.

The LED lamp of this technical solution further includes a wiring terminal 5. As shown in FIG. 4, the conductive terminals 421 are threaded out of the connector body 41; the power supply wire 43 at least includes two pole wires 431; the pole wires 431 are connected to the conductive terminals 421; and the wiring terminal 5 is wrapped outside connection positions between the pole wires 431 and the conductive terminals 421. The wrapped wiring terminal 5 can achieve stable connection between the pole wires 431 and the conductive terminals 421, and the assembling process is simple.

As a further improvement technical solution, the lamp structure further includes a hollow plastic seat 6; the plastic seat 6 is arranged in the accommodating chamber 11; and the LED lamp panel 32 is threaded out of a top end of the plastic seat 6 and extends into the bulb shell 2.

Preferably, a limiting structure 61 is arranged at the top end of the plastic seat 6; the LED lamp panel 32 is threaded out of the top end of the plastic seat 6 and is located and fixed through the limiting structure 61. Meanwhile, the PCB 31 is provided with a limiting step 311 corresponding to the limiting structure 61, and the limiting step 311 resists against a lower end surface of the limiting structure 61. This structure can prevent the PCB 31 from extending excessively and avoid the PCB 31 from being loosened and falling off from the plug-in slot of the connector body 41.

To improve the waterproof performance of the lamp, as shown in FIG. 2, a waterproof step 62 is arranged at a periphery of a lower end of the plastic seat 6; the waterproof step 62 is arranged between a lower end of the bulb shell 2 and the lamp holder 1; and the bulb shell 2 is in threaded connection with the lamp holder 1 and presses the waterproof step 62 to achieve sealing fit between the bulb shell 2 and the lamp holder 1. A decorative lamp is often suspended outdoors. The waterproof step 62 is used as a waterproof rubber ring to achieve a sealing and waterproofing effect. The problem of waterproofing of the lamp structure is solved, so that the lamp structure has a wider range of application scenarios.

Preferably, the PCB 31 is further provided with a controller module 312; and the controller module 312 includes a control IC chip, electronic elements such as a resistor, a capacitor, and a diode, and a protective circuit. All the elements are welded on the PCB 31. The controller module achieves intelligent control of the lamp and maintains the stability of the circuit of the lamp.

In an embodiment, the conductive terminals 421 extend out of the plug-in slot 42 and form bent portions 422; and the bent portions 422 are fixedly connected to side walls of the plug-in slot 42. The bent portions 422 enable the conductive terminals 421 to be effectively fixed in the plug-in slot 42 without high-cost measures such as welding, so that the production process is simplified, and the production cost is saved.

In another embodiment, the conductive terminals 421 are conductive springs embedded in the plug-in slot 42. The conductive springs are elastic and can be in close contact with the conductive modules 33, so that the electric connection between the conductive modules 33 and the conductive terminals 421 is more stable, and the phenomenon of poor contact in the lamp is reduced.

Figure 3:
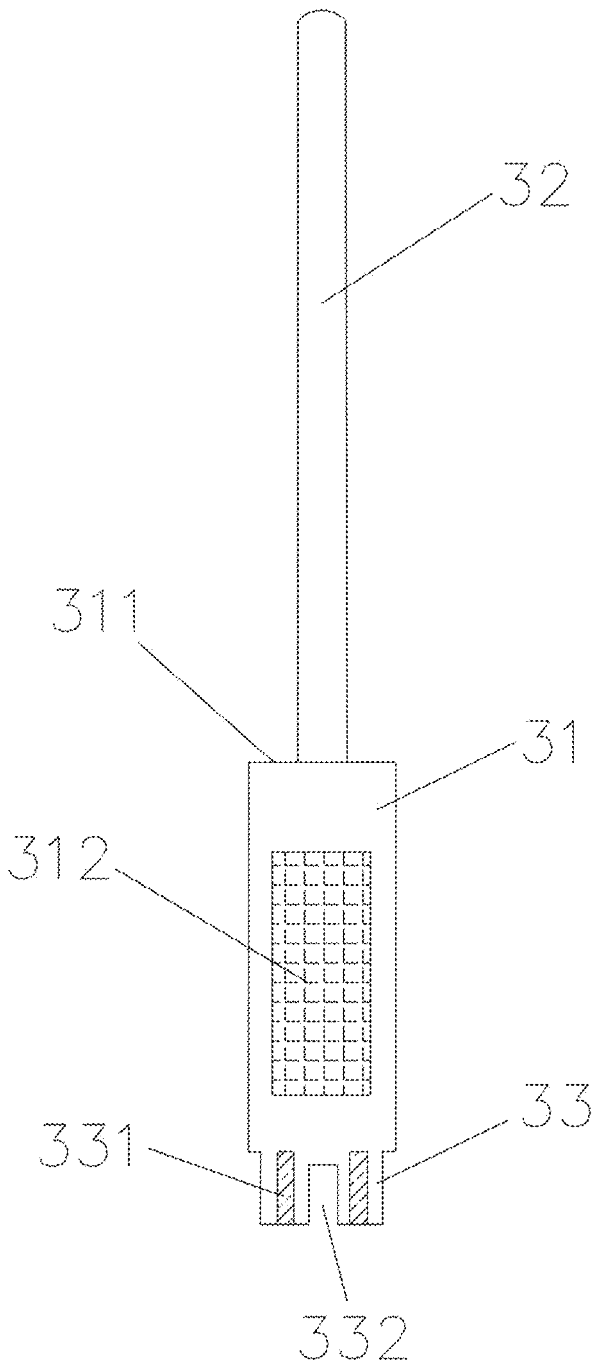
FIG. 3 is a schematic structural diagram of an LED light source assembly of the present disclosure.
Figure 5:
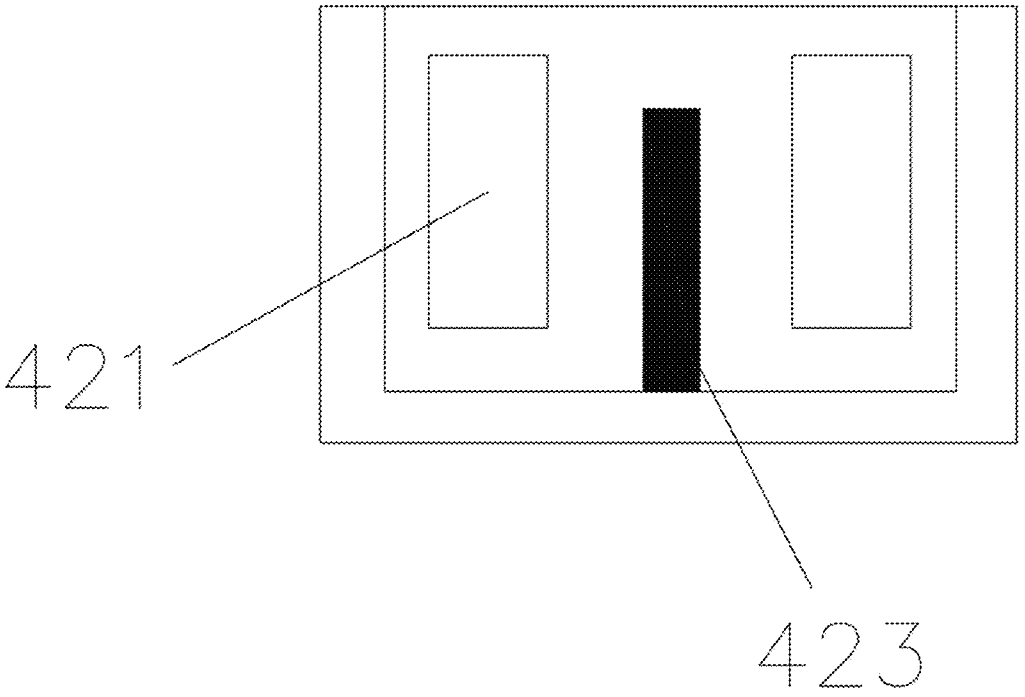
FIG. 5 is a schematic diagram of an internal structure of a plug-in slot of the present disclosure.

As shown in FIG. 3 and FIG. 5, a partition plate 423 is further arranged inside the plug-in slot 42, and the conductive modules 33 are provided with jacks 332 that cooperates with the partition plate 423. When the conductive modules 33 are plugged into the plug-in slot 42, the jacks 332 are correspondingly plugged with the partition plate 423, which can play a role of locating the conductive modules 33 and can further separate the two conductive terminals 421 or conductive contact pieces 331 which are arranged side by side. This significantly lowers the risk of short circuit of the lamp caused by accidental contact between two electrodes.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A light-emitting diode (LED) lamp structure, comprising a lamp holder (1), a bulb shell (2), and an LED light source assembly (3), wherein the lamp holder (1) is provided with an accommodating chamber (11) with an opening; a straight sleeve (12) is integrally formed in the accommodating chamber (11) in an injection molding manner; a female connector (4) is fixedly mounted in the straight sleeve (12); the bulb shell (2) is connected to the lamp holder (1) to form a lamp housing; the LED light source assembly (3) is electrically connected to the female connector (4) and extends into the bulb shell (2);

the female connector (4) comprises a connector body (41); a plug-in slot (42) is provided at a front end of the connector body (41); at least two conductive terminals (421) are arranged in the plug-in slot (42);

the LED light source assembly (3) comprises a PCB (31), an LED lamp panel (32), and conductive modules (33); the LED lamp panel and the conductive modules are respectively electrically connected to two ends of the PCB (31); at least two conductive contact pieces (331) are arranged between the conductive modules (33); and when the conductive modules (33) are plugged into the plug-in slot (42), the conductive contact pieces (331) and the conductive terminals (421) are in mutual contact for conduction.

2. The LED lamp structure according to claim 1, wherein the female connector (4) further comprises a power supply wire (43); the power supply wire (43) is electrically connected to the conductive terminals (421); and the power supply wire (43) extends out of the straight sleeve (12) and is integrally formed with the lamp holder (1) in an injection molding manner.

3. The LED lamp structure according to claim 2, further comprising a wiring terminal (5), wherein the conductive terminals (421) are threaded out of the connector body (41); the power supply wire (43) at least comprises two pole wires (431); the pole wires (431) are connected to the conductive terminals (421); and the wiring terminal (5) is wrapped outside connection positions between the pole wires (431) and the conductive terminals (421).

4. The LED lamp structure according to claim 1, further comprising a hollow plastic seat (6), wherein the hollow plastic seat (6) is arranged in the accommodating chamber (11); and the LED lamp panel (32) is threaded out of a top end of the plastic seat (6) and extends into the bulb shell (2).

5. The LED lamp structure according to claim 4, wherein a limiting structure (61) configured to fix the LED lamp panel (32) is arranged at the top end of the plastic seat (6); the PCB (31) is provided with a limiting step (311) corresponding to the limiting structure (61); and the limiting step (311) resists against a lower end surface of the limiting structure (61).

6. The LED lamp structure according to claim 4, wherein a waterproof step (62) is arranged at a periphery of a lower end of the plastic seat (6); the waterproof step (62) is arranged between a lower end of the bulb shell (2) and the lamp holder (1); and the bulb shell (2) is in threaded connection with the lamp holder (1) and presses the waterproof step (62) to achieve sealing fit between the bulb shell (2) and the lamp holder (1).

7. The LED lamp structure according to claim 1, wherein the PCB (31) is further provided with a controller module (312); and the controller module (312) comprises a control integrated circuit (IC) chip and other electronic devices.

8. The LED lamp structure according to claim 1, wherein the conductive terminals (421) extend out of the plug-in slot (42) and form bent portions (422); and the bent portions (422) are fixedly connected to side walls of the plug-in slot (42).

9. The LED lamp structure according to claim 1, wherein the conductive terminals (421) are conductive springs embedded in the plug-in slot (42).

10. The LED lamp structure according to claim 1, wherein a partition plate (423) is further arranged inside the plug-in slot (42), and the conductive modules (33) are provided with jacks (332) that cooperates with the partition plate (423).

* * * * *